United States Patent
Martini

(10) Patent No.: US 9,699,151 B2
(45) Date of Patent: *Jul. 4, 2017

(54) MANAGE ENCRYPTED NETWORK TRAFFIC USING SPOOFED ADDRESSES

(71) Applicant: iBoss, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/201,260

(22) Filed: Jul. 1, 2016

(65) Prior Publication Data

US 2016/0315919 A1 Oct. 27, 2016

Related U.S. Application Data

(63) Continuation of application No. 14/085,661, filed on Nov. 20, 2013, now Pat. No. 9,386,038.

(51) Int. Cl.
*H04L 29/06* (2006.01)
*H04L 29/12* (2006.01)
(Continued)

(52) U.S. Cl.
CPC ...... *H04L 63/0464* (2013.01); *H04L 61/1511* (2013.01); *H04L 61/2007* (2013.01);
(Continued)

(58) Field of Classification Search
CPC ....... H04L 63/20; H04L 63/30; H04L 63/236; H04L 63/0428; H04L 63/0823;
(Continued)

(56) References Cited

U.S. PATENT DOCUMENTS 7,792,994 B1    9/2010  Hernacki
7,809,953 B2   10/2010  Little et al.
(Continued)

FOREIGN PATENT DOCUMENTS

WO    WO2013/150543    10/2013

OTHER PUBLICATIONS

Heckel: "Use SSLsplit to transparently sniff TLS/SSL connections—including non-HTTP(S) protocols", Philipp's Tech Blog, Aug. 4, 2013, downloaded from the internet at: http://blog.philippheckel.com/2013/08/04/use-sslsplit-to-transparently-sniff-tls-ssl-connections/ on Aug. 3, 2015, 9 pages.

(Continued)

*Primary Examiner* — Noura Zoubair
(74) *Attorney, Agent, or Firm* — Fish & Richardson P.C.

(57) ABSTRACT

Methods and systems for managing encrypted network traffic using spoofed addresses. One example method includes receiving a request to resolve a domain name; determining that the domain name is included in a predetermined set of domain names; associating a spoofed address with the domain name; sending a response to the request to resolve the domain name, the response including the spoofed address; receiving a secure request for a resource, the secure request directed to the spoofed address; determining that the secure request is directed to the domain name based on the association between the spoofed address and the domain name; and selectively decrypting the secure request based at least in part on determining that the secure request is directed to the domain name.

16 Claims, 4 Drawing Sheets

(51) Int. Cl.
*H04L 29/08* (2006.01)
*H04W 76/02* (2009.01)

(52) U.S. Cl.
CPC ...... *H04L 63/0236* (2013.01); *H04L 63/0823* (2013.01); *H04L 63/168* (2013.01); *H04L 63/20* (2013.01); *H04L 67/02* (2013.01); *H04L 69/326* (2013.01); *H04W 76/02* (2013.01)

(58) Field of Classification Search
CPC ............... H04L 63/101; H04L 63/0464; H04L 61/1511; H04L 61/1552; H04L 61/2007; H04L 69/326; H04W 76/02
See application file for complete search history.

(56) References Cited

U.S. PATENT DOCUMENTS

| | | | |
|---|---|---|---|
| 2005/0050362 A1 | 3/2005 | Peles | |
| 2005/0268100 A1 | 12/2005 | Gasparini et al. | |
| 2007/0180510 A1 | 8/2007 | Long | |
| 2008/0222306 A1 | 9/2008 | Bhakta et al. | |
| 2009/0216875 A1* | 8/2009 | Shi | H04L 63/0236 709/224 |
| 2012/0290724 A1* | 11/2012 | Noro | G06F 17/30887 709/225 |
| 2012/0303808 A1 | 11/2012 | Xie | |
| 2013/0031356 A1* | 1/2013 | Prince | H04L 63/0823 713/151 |
| 2013/0283385 A1 | 10/2013 | Martini | |

OTHER PUBLICATIONS

Herrada, "Capture Passwords on HTTPS (SSL) using DNS Spoofing", Feb. 11, 2013, downloaded from the internet at www.hacking-etic.cat/?p=278&lang=en on Oct. 25, 2013, 3 pages.

International Search Report and Written Opinion issued in International Application No. PCT/US2014/066688, mailed Feb. 16, 2015, 12 pages.

International Search Report and Written Opinion issued in International Application No. PCT/US2015/019290, mailed Jun. 11, 2015, 10 pages.

Koponen, et al. "Secure Socket Layer (SSL) Man-in-the-Middle Attack", Apr. 18, 2001, downloaded from the internet at http://sce.uhcl.edu/yang/teaching/csci5931webSecuritySpr04/secure%20Sockets%20Layer%20(SSL)%20Man-in-the-middle%20Attack.htm on Oct. 25, 2013, 4 pages.

* cited by examiner

MANAGE ENCRYPTED NETWORK TRAFFIC USING SPOOFED ADDRESSES

BACKGROUND

This specification generally relates to managing encrypted network traffic using spoofed addresses.

In corporate and other networks, devices connected to the network may request resources on the network itself, or on external networks such as the Internet. These resources may include websites, file transfer services, servers, or other network resources. In some cases, this request may be made according to a secure protocol such as Hypertext Transfer Protocol Secure (HTTPS), Secure Socket Layer (SSL), Transport Level Security (TLS), or other protocols. The requested resources may be associated with domain names. A device may query a domain name server using the Domain Name System (DNS) protocol to determine an address corresponding to a given domain name.

SUMMARY

In general, one aspect of the subject matter described in this specification may be embodied in systems, and methods performed by data processing apparatuses that include the actions of receiving a request to resolve a domain name; determining that the domain name is included in a predetermined set of domain names; associating a spoofed address with the domain name; sending a response to the request to resolve the domain name, the response including the spoofed address; receiving a secure request for a resource, the secure request directed to the spoofed address; determining that the secure request is directed to the domain name based on the association between the spoofed address and the domain name; and selectively decrypting the secure request based at least in part on determining that the secure request is directed to the domain name.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In corporate and other networks, secure connections to resources on the Internet are often identified by either a certificate associated with the connection, such as an SSL certificate, or by the address associated with the connection. For certain Internet resources, such an approach can be problematic. For example, some larger network entities may use a master SSL certificate for all services they operate, such that the domain name assigned to the SSL certificate may be a wildcard domain such as "*.example.com." In such a case, managing access to individual services owned by the network entity may be difficult, as multiple services may share the same wildcard certificate. For example, a network owner desiring to block access to a video streaming site may inadvertently block access to a search engine owned by the same entity, as both sites may share the same certificate. Similarly, some network entities use shared addresses across services, such that blocking an address may have the same effect. When requests are made for network services using a secure protocol such as HTTPS, determining the address requested by the request may not be possible without decrypting the request.

Accordingly, the present disclosure describes techniques for managing secure network traffic using spoofed addresses. One example method includes receiving a DNS request, and providing a spoofed address in response. The spoofed address is associated with the domain name, such that when a request is received on that spoofed address, the request can be associated with the domain name without decrypting the request. By associating the request to the domain name in this manner, the request can be selectively blocked or selectively decrypted and its contents examined to determine how to handle the request.

The techniques described herein may provide several advantages. A network owner may be able to block access to only certain services operated by a large network entity, as the techniques here and do not rely on the domain name included in an SSL certificate to determine the destination for request. Secure traffic may also be selectively decrypted, such that sensitive traffic, such as a user's personal email, may remain encrypted, while other non-sensitive encrypted traffic, such as requests for a video streaming site, may be decrypted and examined.

Figure 1:
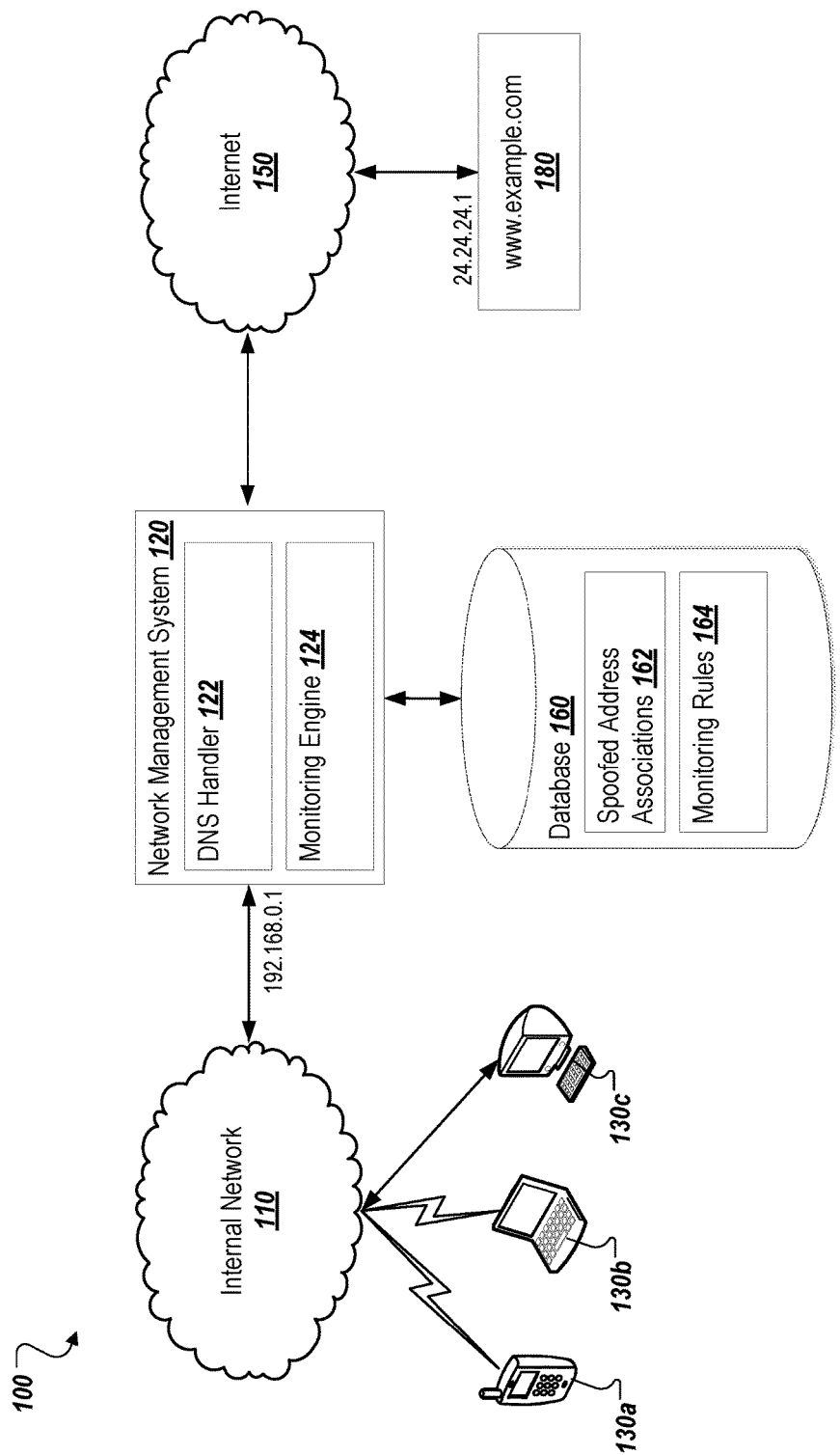
FIG. 1 is a diagram of an example environment.

FIG. 1 is a diagram of an example environment 100. As shown, the example environment includes an internal network 110. A plurality of devices 130a-c are connected to the internal network 110. The example environment 100 also includes a network management system 120. The network management system 120 is connected to a database 160, and the Internet 150. A plurality of websites 180 are connected to the Internet 150.

In operation, the devices 130a-c send DNS queries over the internal network 110 that are received by the network management system 120. The network management system 120 consults the database 160 to determine whether the domain name included in a particular DNS query is to be monitored. If the network management system 120 determines that the domain name is to be monitored, the network management system 120 returns a spoofed address to the requesting device. In some implementations, the spoofed address may be an IP address corresponding to the network management system 120. The spoofed address may also be associated with a server separate from the network management system 120, such as a server connected to the internal network 110, or connected to the Internet 150.

Upon receiving the spoofed address, the requesting device may send a secure request to the spoofed address. In some implementations, the secure request may be a request formatted according to the HTTPS protocol. In implementations where the spoofed address is associated with the network management system 120, the network management system 120 will receive the secure request. Network management system 120 may then determine from the spoofed address a domain name associated with the request. Such a determination is usually not possible without decrypting the secure request, because the requested domain name is included within the encrypted payload. However, by associating the spoofed address with the domain name when processing the DNS query, the network management system 120 may determine that a request to the spoofed address is directed to the domain name without decrypting the secure request.

In some implementations, the network management system 120 may selectively decrypt received secure request based on one or more monitoring rules 164 stored in the database 160. The network management system 120 may examine the contents of the secure request after decrypting in order to determine how to handle the secure request. For example, the network management system 120 may forward or block the received secure request based on the contents of the decrypted request. In some implementations, the network management system 120 may determine whether to forward or block the secure request without decrypting.

As shown, the environment 100 includes an internal network 110. In some implementations, the internal network 110 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA or any other suitable wireless networking technology. In such implementations, the wireless network may be a public network in the sense that any device within range may connect to the network. Even though any device within range may connect to the internal network 110 in such configurations, the device still may be required to authenticate in order to access resources on the internal network 110 and/or on the Internet 150. Such a configuration is often referred to as a Bring Your Own Device (BYOD) network in which users are free to use their own personal devices for connecting to the network. In some implementations, the entity that controls the internal network 110 may issue devices to users for use on the internal network 110. The internal network 110 may also be a wired network, such as an Ethernet network.

The environment 100 also includes one or more devices 130a-c connected to internal network 110. In some implementations, the one or more devices 130a-c include mobile devices, such as cellular telephones (e.g., 130a), smartphones, tablets, laptops (e.g., 130b) and other similar computing devices. The one or more devices 130a-c may also include wired devices such as desktop computer 130c. The one or more devices 130a-c may also include servers. In some implementations, the one or more devices 130a-c include personal devices associated with one or more users. The one or more devices 130a-c may also include devices issued or owned by the entity that provides the internal network 110, such as company-issued smartphones or laptops. In some implementations, the one or more devices 130a-c may include network access or web browsing software (e.g., a web browser) for accessing resources on the Internet 150.

The network management system 120 is connected to the internal network 110. As described above, the network management system 120 is operable to receive DNS requests from the one or more devices 130a-c, selectively return spoofed addresses in response to the DNS queries, and monitor secure requests sent by the one or more devices 130a-c directed to the Internet 150. In some implementations, the network management system may be a server or set of servers connected to the internal network 110. The network management system may be configured as a gateway between the internal network 110 and the Internet 150, such that traffic directed to the Internet 150 passes through the network management system 120. The network management system 120 may also be configured to passively monitor traffic on the internal network 110, such as in a tap or span configuration. In some implementations, the network management system 120 may receive part of the traffic directed to the Internet 150, such that traffic directed to domain names to be monitored passes through the network management system 120, the traffic directed to domain names that are not being monitored does not pass through the network management system 120. In some implementations, the DNS functionality and the monitoring functionality of the network management system 120 may be implemented on separate servers in communication and coordination with one another.

The network management system 120 includes a DNS handler 122. In operation, the DNS handler 122 may receive DNS requests from the one or more devices 130a-c connected to the internal network 110. The DNS handler may consult monitoring rules 164 stored in the database 160 (discussed below) to determine whether to return a spoofed address in response to a particular DNS query. For example, the monitoring rules 164 may specify that all traffic to the domain name "www.example.com" should be monitored. In such a configuration, the DNS handler 122 may respond to a DNS request including the domain name "www.example.com" with a spoofed address, such as the address "192.168.0.1" shown associated with the network management system 120 in FIG. 1. In some implementations, the spoofed address may be an IP address associated with the network management system 120. The DNS handler 122 may note this association between the domain name from the DNS query and the returned spoofed address in the database 160 as a spoofed address association 162 (described below).

In some implementations, if the DNS handler 122 determines that the domain name in a particular DNS request is not to be monitored, the DNS handler 122 may return an actual address associated with the requested domain name. For example, in response to a request for an address corresponding to "www.example.com" in the situation that that domain name was not being monitored, the DNS handler 122 would return the address corresponding to website 180 (e.g., "24.24.24.1").

The DNS handler 122 may receive DNS entries mapping domain names to addresses from a DNS server or DNS servers connected to the Internet 150. In some implementations, the DNS handler 122 may cache these DNS entries and provide information in the cached entries in response to DNS requests for domain names that are not to be monitored. The DNS handler 122 may also forward DNS requests for domain names that are not to be monitored to DNS servers connected to the Internet 150, and forward the received responses back to the requesting device. In some implementations, the DNS handler 122 may utilize local DNS servers connected to the internal network 110.

The network management system 120 also includes a monitoring engine 124. In operation, the monitoring engine 124 receives secure requests from the one or more devices 130a-c that are directed to a spoofed address. The monitoring engine 124 may consult the spoofed address associations 162 in the database 160 (described below) to determine a domain name associated with the secure request received on a spoofed address. Based on the domain name, monitoring engine 124 may determine how to handle the secure request.

For example, the monitoring engine 124 may identify a monitoring rule 164 associated with the domain name "www.example.com." The monitoring engine 124 may receive a secure request on "192.168.0.1," the spoofed address associated with the domain name "www.example.com." The monitoring engine 124 may determine that the monitoring rule 164 associated with this domain name indicates the monitoring engine should forward the secure request on to the server associated with the domain name. In response, the monitoring engine 124 may forward the secure request to the website 180 at the appropriate address (e.g., "24.24.24.1"). If the monitoring engine 124 determines that the monitoring rule 164 indicates that the request should be blocked, the monitoring engine 124 may block the request.

In some implementations, the monitoring engine 124 may selectively decrypt secure requests received on a spoofed address based on the monitoring rules 164. Based on the contents of the decrypted secure request, the monitoring engine 124 may forward, block, or otherwise handle the secure request. For example, the monitoring engine 124 may examine the headers of the decrypted secure request, and determine that the request has a referrer header prohibited by the associated monitoring rule 164. In response, the monitoring engine 124 may block the secure request. In some implementations, the monitoring engine 124 may modify the decrypted secure request based on the monitoring rules 164. For example, the monitoring engine 124 may replace the referrer header in the secure request with a different referrer header. The monitoring engine 124 may then re-encrypt the decrypted secure request, and forward it to the appropriate destination.

Although the DNS handler 122 and the monitoring engine 124 are shown as separate components, in some implementations the two components may be combined. In some cases, the two components may be separate modules within a single software process. The DNS handler 122 and monitoring engine 124 may also be located on separate servers connected to the internal network 110. The monitoring engine 124 may be in communication with one or more monitoring servers to which spoofed addresses are pointed. The monitoring servers may communicate with the monitoring engine 124 in order to determine how to handle secure requests received.

The database 160 is connected to the network management system 120. In some implementations, the database 160 may be stored on the same server as the network management system 120. The database 160 may also be stored on a separate server and accessed by the network management system 120 over a network. The database 160 may be any proprietary or commercially available database system or format, including, but not limited to, MySQL®, Microsoft® SQLServer, IBM® DB2, Oracle®, SQLite, or any other suitable database system or format. The database 160 may also be a distributed database running on a plurality of servers. In some implementations, the database 160 may be a configuration file or set of configuration files associated with the network management system 120.

The database 160 includes spoofed address associations 162. In some implementations, the spoofed address associations 162 arose within a database table mapping domain names to spoofed addresses. In some implementations, the spoofed addresses are unique such that only one spoofed address may be associated to anyone domain name. In some implementations, the spoofed addresses may be an IP address and port combination. The spoofed addresses may also be selected from a pool of spoofed addresses. For example, a network administrator may specify that all addresses on the subnet "192.168.*.*" are spoofed addresses, and that the network management system 120 should select an address from this pool when it needs a new spoofed address. In some implementations, specific addresses may be specified as spoofed addresses, and the designations of spoofed addresses may be stored within the database 160.

Database 160 also includes monitoring rules 164. In some implementations, the monitoring rules 164 may specify actions to be performed for traffic directed to a particular domain name. For example, a monitoring rule 164 may specify that traffic for the domain name "www.example.com" should be directed to a particular spoofed address pool, that all the traffic directed to the domain name should be decrypted, and traffic including a referrer header of "www.badguy.com" should be blocked.

Figure 2:
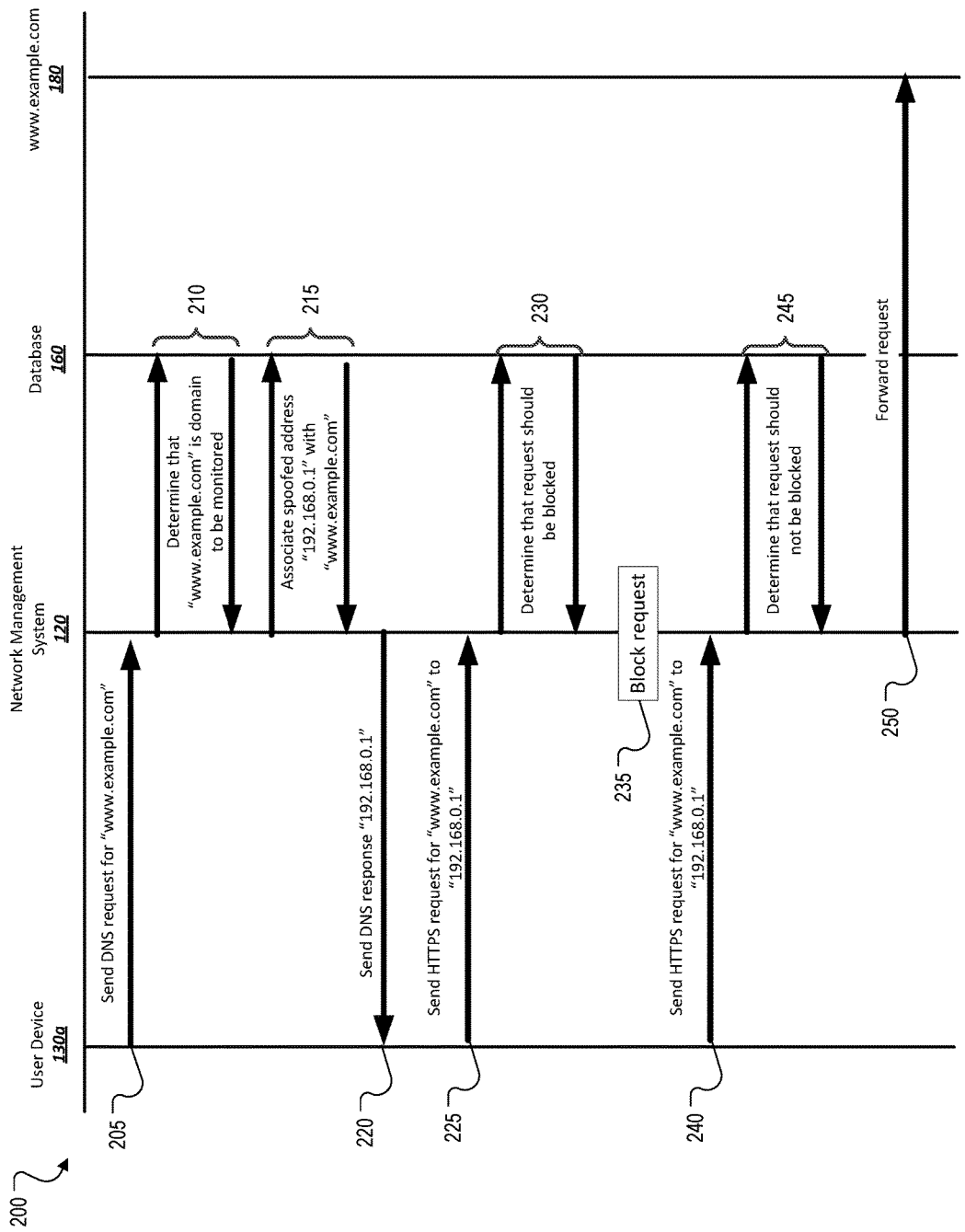
FIG. 2 is a message flow diagram of an example interaction between the components of the example environment to manage encrypted network traffic using spoofed addresses.

FIG. 2 is a message flow diagram of an example interaction 200 between the components of the example environment 100 to manage encrypted network traffic using spoofed addresses. At 205, the user device 130 a sends the DNS request for "www.example.com" to the network management system 120. At 210, the network management system 120 consults the database 160 to determine that the domain name "www.example.com" is a domain name to be monitored. In some implementations, the network management system 120 queries the database 160 for a monitoring rule associated with the domain name "www.example.com."

Upon determining that the domain name "www.sample.com" should be monitored, the network management system 120 interacts with the database to associate the spoofed address "192.168.0.1" with the domain name "www.sample.com" (at 215). In some implementations, the network management system 120 inserts a new row into a table storing the spoofed address associations 162 (shown in FIG. 1). In some implementations, associating the spoofed address may include selecting a free address from a pool of spoofed addresses in the database 160. Associating the spoofed address may also include selecting a specific address configured for the requested domain name from the database 160.

At 220, the network management system 120 sends a DNS response including the spoofed address "192.168.0.1." At 225, the device 130a sends an HTTPS request for "www.example.com" to the spoofed address "192.168.0.1." In some implementations, the request may be sent using a secure protocol other than HTTPS.

At 230, the network management system 120 consults the database to determine that the request should be blocked. In some implementations, the network management system 120 may create a database 160 for a monitoring rule 164 associated with the domain and. The network management system 120 may then consult the monitoring rule 164 to determine that the request should be blocked. In some implementations, as described previously, the network management system 120 may decrypt the received request in order to determine that the request should be blocked. Network management system 120 may examine the decrypted request and determine whether to block the request based on the contents of the request. At 235, the network management system 120 blocks the request. In some implementations, blocking the request may include dropping the request. Blocking the request may also include returning a response to the user device 130 a indicating that the request is been blocked.

At 240, the user device 130 a sends an HTTPS request for "www.example.com" to "192.168.0.1." At 245, the network management system 120 consults the database 160 to determine that the request should not be blocked. In some implementations, as discussed previously, the network management system 120 may decrypt the request and examine its contents to determine whether the request should be blocked. Upon determining that the request should not be blocked, at 250, the network management system 120 forwards the request to the website 180 corresponding to the domain name "www.example.com."

Figure 3:
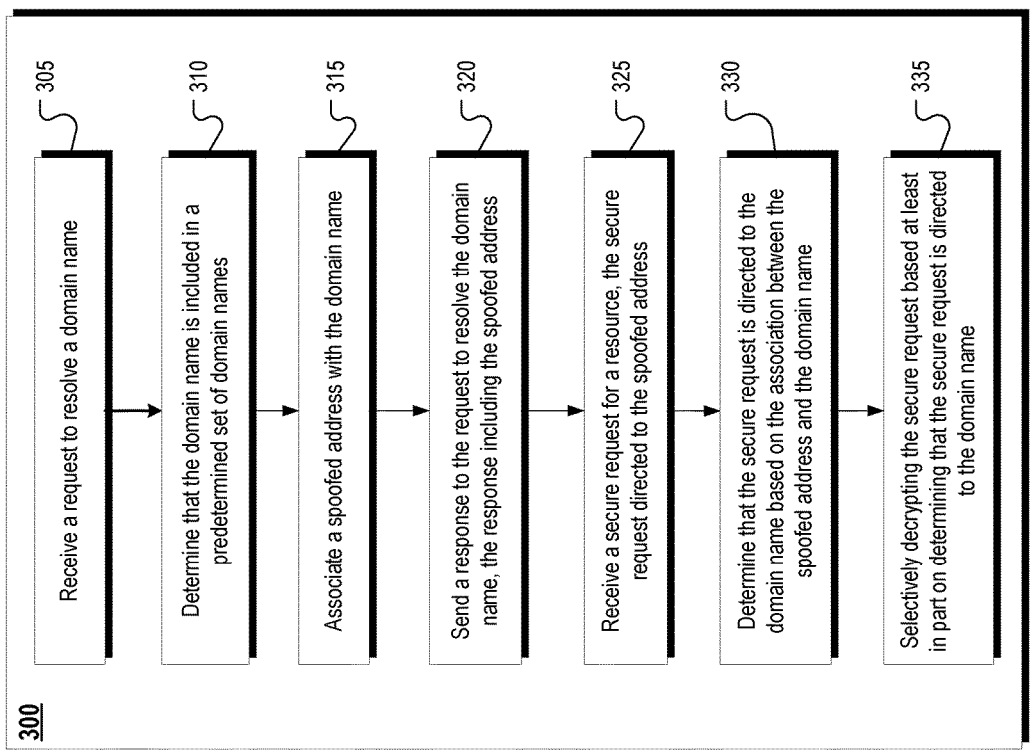
FIG. 3 is a flow chart of an example process of managing encrypted network traffic using spoofed addresses.

FIG. 3 is a flow chart of an example process 300 of managing encrypted network traffic using spoofed addresses. At 305, a request is received to resolve the domain name. In some implementations, the request may be received according to the DNS protocol. At 310, a determination is made that the domain name is included in a predetermined set of domain names. In some implementations, the determination may be made by consulting a database (e.g., 160).

At 315, a spoofed address associated with the domain name. In some implementations, the spoofed address as a local address on the same network as a device that sent the request to resolve the domain name. Spoofed address may also be an address on the public network, such as the Internet. In some cases, the spoofed address may be an IP address, an IP address and port combination, or another type of address.

At 320, a response to the request to resolve the domain name is sent, the response including the spoofed address. In some implementations, the response is sent according to the DNS protocol. At 325, a secure request for resource is received, the secure request directed to the spoofed address. At 330, a determination is made that the secure request is directed to the domain name based on the association between the spoofed address and the domain.

At 335, the secure request is selectively decrypted based at least in part on determining that the secure request is directed to the domain name. In some implementations, selectively decrypting the secure requests includes determining that the secure request should be decrypted based at least in part on one or more rules, and decrypting secure request to generate decrypted information. The decrypted information may be inspected in order to determine whether to forward, block, and/or modify the secure request.

In some implementations, receiving the secure request may include establishing a first secure connection with a sender of the secure request, and establishing a second secure connection with an address associated with the resource after establishing the first secure connection with the sender. Such an approach is generally known as a "client first" procedure.

In some implementations, receiving the secure request may include establishing a first secure connection with an address associated with the resource, and establishing a second secure connection with a sender of the secure request after establishing the first secure connection with the address associated with the resource. Such an approach is generally known as a "server first" procedure.

In some cases, a request to resolve a second domain name different than the first domain name is received. A determination is made with the second domain name is not included in the predetermined set of domain names, and a response to the request to resolve the second domain name is set including an address corresponding to the second domain. In some implementations, if the domain name is not included in the predetermined set of domain names, the request to resolve the domain name may be forwarded on to a DNS server, and the response from the DNS server may be forwarded back to the requester.

In some implementations, a second request to resolve the domain name is received. A determination is made that the domain name is associated with the spoofed address, and a response is sent to the second request including the spoofed address, such that a new spoofed address is not associated with the domain name.

Figure 4:
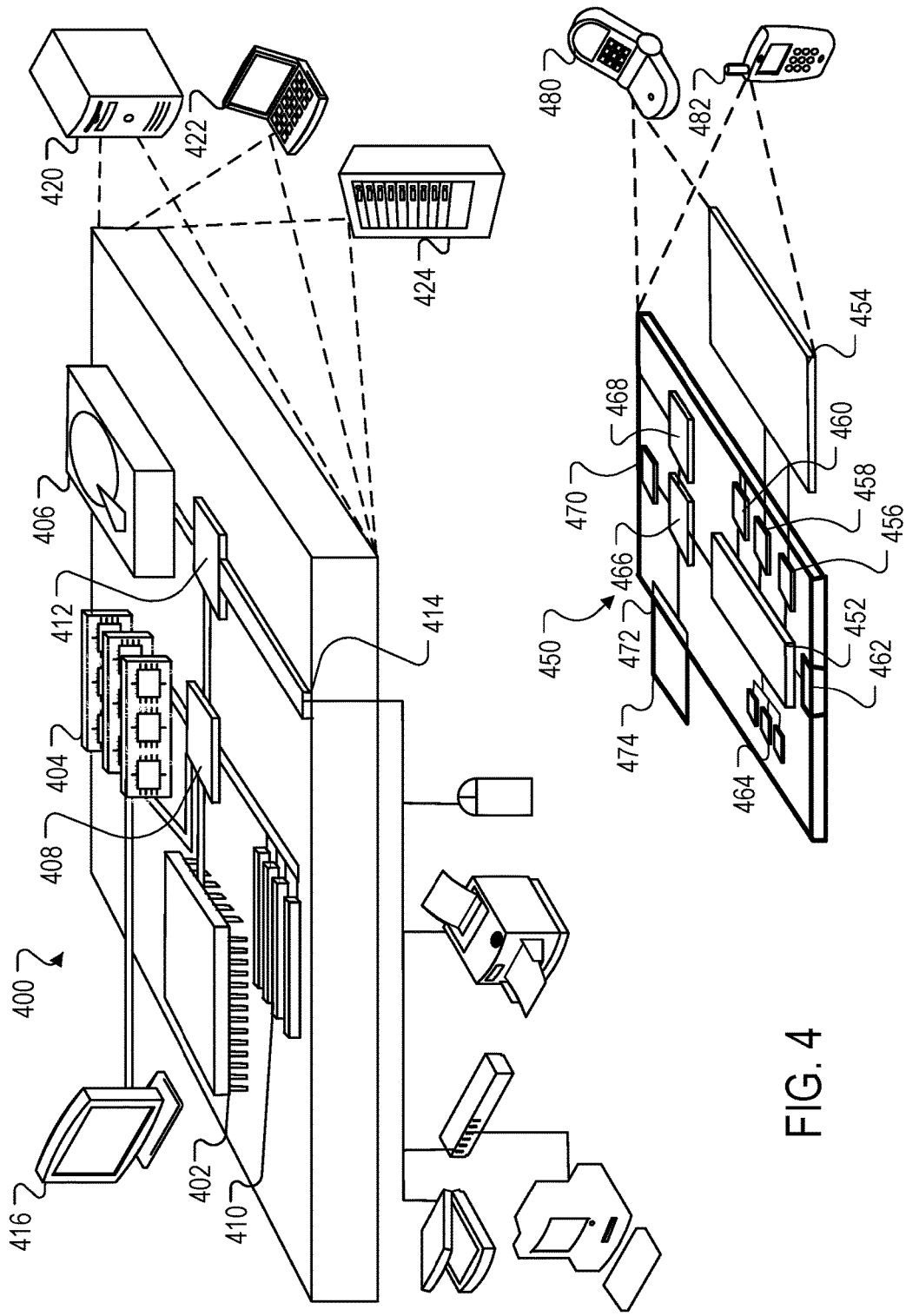
FIG. 4 is a diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for determining a destination for secure web traffic executed by one or more processors, the method comprising:

receiving a request to resolve a domain name from a client;

determining that the domain name corresponds to a real Internet Protocol (IP) address that also corresponds to at least one other domain name, wherein the real IP address corresponds to a first network location hosting a particular resource;

in response to determining that the domain name corresponds to the real IP address that also corresponds to at least one other domain name, creating an association between a spoofed IP address and the domain name, wherein the spoofed IP address is different than the real IP address corresponding to the domain name and corresponds to a second network location different than the first network location, and wherein the associated spoofed IP address uniquely identifies the domain name;

sending a response to the request to resolve the domain name to the client, the response including the spoofed IP address associated with the domain name;

receiving, at the second network location corresponding to the spoofed IP address, an encrypted request for the particular resource hosted at the first network location, the encrypted request directed to the spoofed IP address associated with the domain name;

determining that the encrypted request is directed to the domain name based on the association between the spoofed IP address and the domain name, wherein the determination is performed without decrypting the encrypted request; and selectively blocking the encrypted request, or selectively decrypting the encrypted request, examining the decrypted contents of the encrypted request, and determining how to handle the encrypted request based on examining of the decrypted contents, wherein selectively blocking or decrypting the encrypted request is based at least in part on determining that the encrypted request is directed to the domain name.

2. The method of claim 1, wherein selectively decrypting the encrypted request comprises:

determining that the encrypted request should be decrypted based at least in part on one or more rules; and decrypting the encrypted request to generate decrypted information.

3. The method of claim 2, wherein determining how to handle the encrypted request comprises:

inspecting the decrypted information;

determining that the encrypted request should be forwarded based at least in part on inspecting the decrypted information and at least in part on the one or more rules; and forwarding the encrypted request to the real IP address associated with the domain name.

4. The method of claim 3, wherein forwarding the encrypted request comprises:

re-encrypting the encrypted request; and sending the encrypted request to the real IP address associated with the domain name.

5. The method of claim 2, wherein determining how to handle the encrypted request comprises:
 inspecting the decrypted information;
 determining that the encrypted request should be forwarded based at least in part on inspecting the decrypted information and at least in part on the one or more rules;
 modifying the decrypted information based at least in part on the one or more rules;
 encrypting the decrypted information to produce a second encrypted request; and
 forwarding the encrypted request to the real IP address associated with the domain name.

6. The method of claim 2, wherein determining how to handle the encrypted request comprises:
 inspecting the decrypted information;
 determining that the encrypted request should be blocked based at least in part on inspecting the decrypted information and at least in part on the one or more rules; and
 blocking the encrypted request.

7. The method of claim 6, wherein blocking the encrypted request includes sending a redirect response to the encrypted request, the redirect response including an address associated with a block notification page.

8. The method of claim 1, wherein receiving the encrypted request for the particular resource comprises:
 establishing a first secure connection with a sender of the encrypted request; and
 establishing a second secure connection with the first network location hosting the particular resource identified by the encrypted request after establishing the first secure connection with the sender.

9. The method of claim 1, wherein receiving the encrypted request for the particular resource comprises:
 establishing a first secure connection with the first network location hosting the particular resource identified by the encrypted request; and
 establishing a second secure connection with a sender of the encrypted request after establishing the first secure connection with the first network location.

10. The method of claim 1, wherein selectively decrypting the encrypted request comprises:
 determining that the encrypted request should not be decrypted based at least in part on one or more rules; and
 forwarding the encrypted request to the real IP address associated with the domain name.

11. The method of claim 1, wherein the domain name is a first domain name, the method further comprising:
 receiving a request to resolve a second domain name different than the first domain name;
 determining that the second domain name corresponds to a real Internet Protocol (IP) address that does not also correspond to another domain name; and sending a response to the request to resolve the second domain name, the response including the real IP address corresponding to the second domain name.

12. The method of claim 1, wherein the request to resolve the domain name is a first request, and the method further comprising:
 after receiving the first request, receiving a second request to resolve the domain name;
 determining that the domain name is associated with the spoofed IP address; and
 sending a response to the second request to resolve the domain name, the response including the spoofed IP address.

13. The method of claim 1, wherein the spoofed IP address includes an IP port.

14. The method of claim 1, wherein receiving the encrypted request for the particular resource includes receiving a request according to Hypertext Transfer Protocol Secure (HTTPS).

15. A non-transitory, computer-readable medium storing instructions operable when executed to cause at least one processor to perform operations comprising:
 receiving a request to resolve a domain name from a client;
 determining that the domain name corresponds to a real Internet Protocol (IP) address that also corresponds to at least one other domain name, wherein the real IP address corresponds to a first network location hosting a particular resource;
 in response to determining that the domain name corresponds to the real IP address that also corresponds to at least one other domain name, creating an association between a spoofed IP address and the domain name, wherein the spoofed IP address is different than the real IP address corresponding to the domain name and corresponds to a second network location different than the first network location, and wherein the associated spoofed IP address uniquely identifies the domain name;
 sending a response to the request to resolve the domain name to the client, the response including the spoofed IP address associated with the domain name;
 receiving, at the second network location corresponding to the spoofed IP address, an encrypted request for the particular resource hosted at the first network location, the encrypted request directed to the spoofed IP address associated with the domain name;
 determining that the encrypted request is directed to the domain name based on the association between the spoofed IP address and the domain name, wherein the determination is performed without decrypting the encrypted request; and
 selectively blocking the encrypted request, or
 selectively decrypting the encrypted request, examining the decrypted contents of the encrypted request, and determining how to handle the encrypted request based on examining of the decrypted contents,
 wherein selectively blocking or decrypting the encrypted request is based at least in part on determining that the encrypted request is directed to the domain name.

16. A system comprising:
 memory for storing data; and
 one or more processors operable to perform operations comprising:
  receiving a request to resolve a domain name from a client;
  determining that the domain name corresponds to a real Internet Protocol (IP) address that also corresponds to at least one other domain name, wherein the real IP address corresponds to a first network location hosting a particular resource;
  in response to determining that the domain name corresponds to the real IP address that also corresponds to at least one other domain name, creating an association between a spoofed IP address and the domain name, wherein the spoofed IP address is different than the real IP address corresponding to the domain name and corresponds to a second network location different than the first network location, and wherein the associated spoofed IP address uniquely identifies the domain name;

sending a response to the request to resolve the domain name to the client, the response including the spoofed IP address associated with the domain name;

receiving, at the second network location corresponding to the spoofed IP address, an encrypted request for the particular resource hosted at the first network location, the encrypted request directed to the spoofed IP address associated with the domain name;

determining that the encrypted request is directed to the domain name based on the association between the spoofed IP address and the domain name, wherein the determination is performed without decrypting the encrypted request; and selectively blocking the encrypted request, or selectively decrypting the encrypted request, examining the decrypted contents of the encrypted request, and determining how to handle the encrypted request based on examining of the decrypted contents, wherein selectively blocking or decrypting the encrypted request is based at least in part on determining that the encrypted request is directed to the domain name.

* * * * *